US012192248B2

(12) United States Patent
O'Hara et al.

(10) Patent No.: US 12,192,248 B2
(45) Date of Patent: Jan. 7, 2025

(54) DECRYPTION OF PERFECT FORWARD SECRECY (PFS) AND NON-PFS SESSIONS

(71) Applicant: Arbor Networks, Inc., Westford, MA (US)

(72) Inventors: Sean O'Hara, Saline, MI (US);
Archana Adiyamankottai Rajaram, Ann Arbor, MI (US)

(73) Assignee: ARBOR NETWORKS, INC., Westford, MA (US)

( * ) Notice: Subject to any disclaimer, the term of this patent is extended or adjusted under 35 U.S.C. 154(b) by 557 days.

(21) Appl. No.: 17/523,851

(22) Filed: Nov. 10, 2021

(65) Prior Publication Data

US 2023/0144993 A1    May 11, 2023

(51) Int. Cl.
*H04L 9/40* (2022.01)

(52) U.S. Cl.
CPC ........ *H04L 63/205* (2013.01); *H04L 63/0428* (2013.01)

(58) Field of Classification Search
CPC .. H04L 63/205; H04L 63/0428; H04L 63/166
See application file for complete search history.

(56) References Cited

U.S. PATENT DOCUMENTS

| 10,033,703 | B1* | 7/2018 | Sharifi Mehr | H04L 63/0428 |
| 10,432,406 | B1* | 10/2019 | Amdahl | H04L 63/205 |
| 2015/0271145 | A1* | 9/2015 | Jalisatgi | H04L 63/0428 |
| | | | | 713/168 |
| 2016/0226827 | A1* | 8/2016 | Bohannon | H04L 63/0823 |
| 2018/0167207 | A1* | 6/2018 | Chaubey | H04L 9/0841 |
| 2019/0141078 | A1* | 5/2019 | Punadikar | H04L 9/0816 |
| 2019/0273728 | A1* | 9/2019 | Sharifi Mehr | H04L 63/205 |
| 2020/0028946 | A1* | 1/2020 | Vora | H04L 1/1874 |

* cited by examiner

*Primary Examiner* — Michael R Vaughan
(74) *Attorney, Agent, or Firm* — Foley & Lardner LLP

(57) ABSTRACT

A computer-implemented method and a computer system are provided for selecting active or passive decryption mode when observing network traffic between a downstream client and an upstream server. The method includes selecting a decryption mode in an initial stage of setting up a secure session based on a determination of a most probable decryption mode based on decryption modes used for similar and/or past secure sessions, wherein the initial stage is when the client initiates a transport layer connection before the transport layer connection or the secure session is established. The method further includes validating the selected decryption mode at least once during the secure session based on whether the selected decryption mode is actually and/or is probably supported based on security algorithms supported by the client and/or server, and switching the decryption mode based on a result of validating the selected decryption mode.

11 Claims, 6 Drawing Sheets

DECRYPTION OF PERFECT FORWARD SECRECY (PFS) AND NON-PFS SESSIONS

BACKGROUND

1. Field of the Disclosure

The present disclosure relates to network communication, and more particularly, optimization of decryption of perfect forward secrecy (PFS) and non-PFS sessions during network communication.

2. Description of Related Art

Cryptography can be used for encrypting and decrypting data to prevent unauthorized access, e.g., by observation of communication between the client and server. Cryptography can use a key agreement protocol that uses one or more shared keys (also referred to as shared secrets), to maintain secrecy during exchanges between the client and server. At times cryptography can use a key agreement protocol that implements perfect forward secrecy (PFS). PFS uses a session key per secure session that is both ephemeral and unique to a secure session. At other times, cryptography can use a key agreement protocol that implements non-PFS.

Sessions can be defined by a communication protocol used by the client and server. In an example client-server protocol, a session is initiated by a client request to a server and can include one or more exchanges between the client and server during which the server replies to and/or services the request.

A middlebox can operate between the client and server for implementing either the PFS or non-PFS during each session. The middlebox can perform decryption for providing an encrypted message received from one of the client or server in decrypted or encrypted form to the other of the client or server. When PFS is implemented, the middlebox can either passively decrypt traffic by using a long-lived Pre-Shared Key (PSK) or export ephemeral session keys directly from the server. However, each of these solutions have disadvantages. While use of a PSK may be considered acceptable for non-PFS sessions, when used with PFS sessions there is a loss of the benefits sought by PFS. Exportation of a session key by the middle box adds risk of attack aimed at stealing the session key.

In order to avoid these risks, a middlebox can actively proxy traffic that establishes a security channel traffic between the client and server. Active proxying includes terminating a secure session established with a downstream client and originating an additional secure session established with the upstream server.

A middlebox can actively proxy traffic, including both PFS and non-PFS sessions. However, there is a significant performance penalty when actively proxying non-PFS sessions of the traffic when compared to using a passive model. The penalty is due in large part to addition of the additional secure session, which effectively doubles network Round Trip Time (RTT) and cryptographic operations.

While conventional methods and systems have generally been considered satisfactory for their intended purpose, there is still a need in the art for a secure method of managing traffic that includes both PFS and non-PFS sessions in an efficient or optimized manner that avoids penalties when not needed or warranted.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a computer-implemented method of selecting active or passive decryption mode when observing network traffic between a downstream client and an upstream server. The method includes selecting a decryption mode in an initial stage of setting up a secure session based on a determination of a most probable decryption mode based on decryption modes used for similar and/or past secure sessions, wherein the initial stage is when the client initiates a transport layer connection before the transport layer connection or the secure session is established. The method further includes validating the selected decryption mode at least once during the secure session based on whether the selected decryption mode is actually and/or is probably supported based on security algorithms supported by the client and/or server. The method further includes switching the decryption mode based on a result of validating the selected decryption mode.

In one or more embodiments, the method can further include, when the selected mode is active, before switching the decryption mode, determining whether an impact of changing the decryption mode would satisfy an impact criterion, wherein the decryption mode is switched only if the impact criterion is satisfied.

In one or more embodiments, determining whether an impact of changing the decryption mode would satisfy an impact criterion can be performed after the server establishes the secure session and communicates which security algorithms it can support for the secure session.

In one or more embodiments, determining whether an impact of changing the decryption mode would satisfy an impact criterion can include predicting a retry time to reset a transport layer for both downstream and upstream channels of the secure session and for the client to reconnect to the secure session with the switched decryption mode and predicting an active session time of the secure session without resetting the transport layer or switching the decryption mode. The impact criterion can require that a predicted passive session time, including the retry time, is less than the predicted active session time.

In one or more embodiments, the predicted retry time for the downstream channel can be based on a measured round trip time of the client and a comparison of a statistical function of actual round trip times for the client.

In one or more embodiments, the decryption mode may not be evaluated again after being switched.

In one or more embodiments, the similar secure sessions can include multiple series of secure sessions, wherein each series of secure sessions can be defined by different session characteristics.

In one or more embodiments, validating the selected decryption mode can be based on whether the selected decryption mode is actually and/or is probably supported by the security algorithms supported by the client and can be performed after the client initiates the secure session and communicates the security algorithms it supports, and before the server establishes the secure session and communicates the security algorithms it supports.

In one or more embodiments, validating the selected decryption mode can be based on whether the selected decryption mode is actually and/or is probably supported by the security algorithms supported by the server and can be performed after the server establishes the secure session and communicates the security algorithms the session will use.

In accordance with further aspects of the disclosure, a network monitor is provided that performs the disclosed method. In accordance with still further aspects of the disclosure a non-transitory computer readable storage medium and one or more computer programs embedded therein is provided, which when executed by a computer system, cause the computer system to perform the disclosed method.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
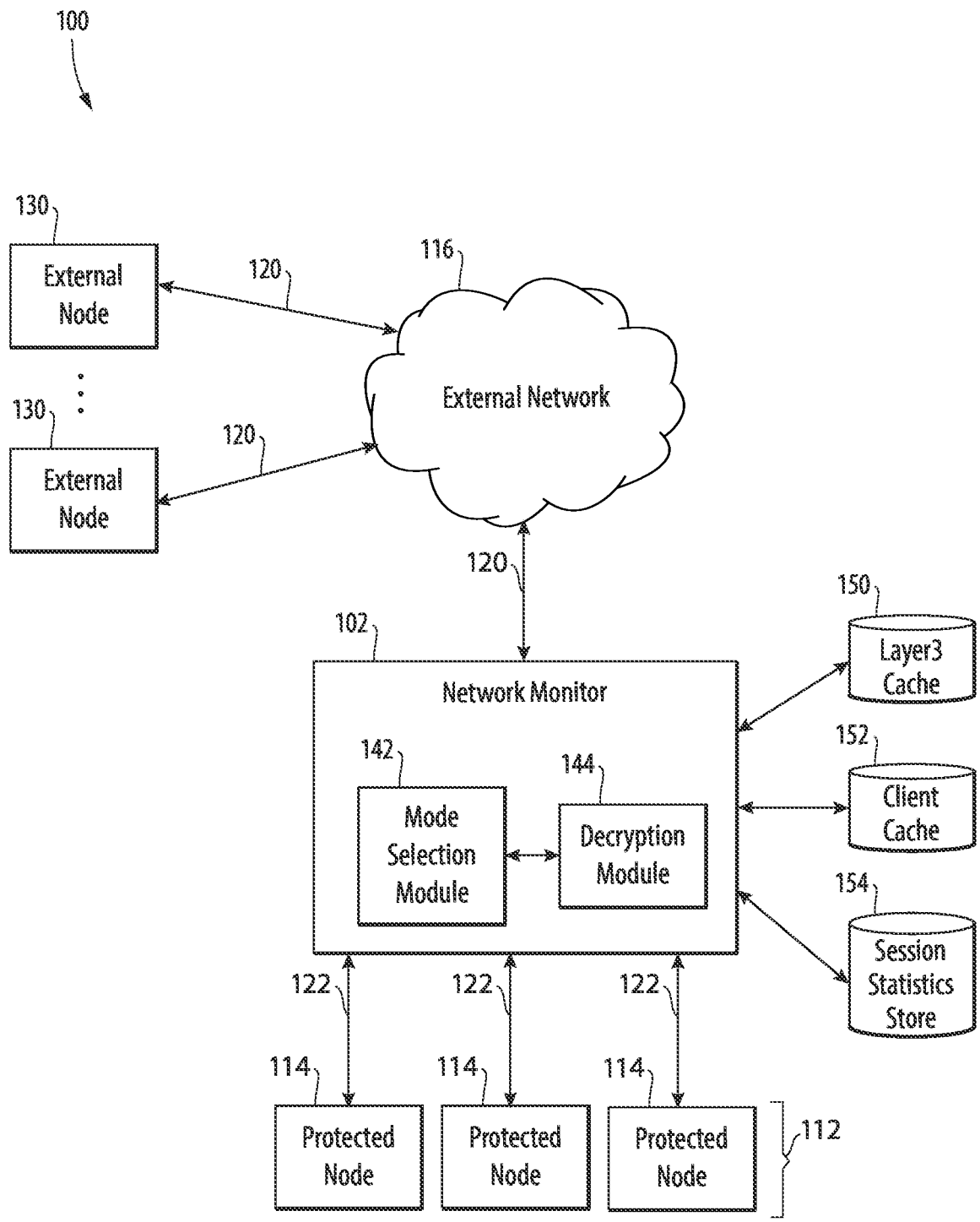
FIG. 1 illustrates a block diagram of an example network system having network monitor that is equipped with a mode selection module, in accordance with an aspect of the disclosure.

Reference will now be made to the drawings wherein like reference numerals identify similar structural features or aspects of the subject disclosure. For purposes of explanation and illustration, and not limitation, a block diagram of an exemplary embodiment of a network system 100 in accordance with the disclosure is shown in FIG. 1 and is designated generally by reference character 100. Methods associated with optimizing decryption of perfect forward secrecy (PFS) and non-PFS secure sessions during network communication associated with a protected network of the network system 100 in accordance with the disclosure, or aspects thereof, are provided in FIGS. 2-6, as will be described. The systems and methods described herein can be used to monitor network traffic for optimization of decryption of PFS and non-PFS secure sessions during network communication.

With reference now to FIG. 1, network system 100 includes a network monitor 102 that monitors one or more protected networks 112, each protected network having one or more protected nodes 114. External nodes 130 can communicate with protected nodes 114 via an external network 116. Communication between one of the protected nodes 114 and one of the external nodes 130 can be in accordance with a client/server model, in which one of the protected node 114 and the external node 130 functions as a client that requests a service, and the other of the protected node 114 and the external node 130 functions as a server that responds to the client for providing the requested service.

Network monitor 102 monitors network traffic to and from protected nodes 114 of the one or more protected networks 112, such as for analyzing request traffic output by external nodes 116 to protected nodes 114. The network monitor 102 includes or accesses a mode selection module 142, a decryption module 144, a layer 3 (L3) cache 150, a client cache 152, and a session statistics store 154. Mode selection module 142 is configured to use information obtained at an early stage of a secured transport layer session and analyze this information in view of data stored by L3 cache 150, client cache 152, and session statistics 154. Mode selection module 142 selects a passive or active decryption mode based upon a result of the analysis. Mode selection module 142 is further configured to validate the selected decryption mode and determine whether to switch the decryption mode based on a result of the validation. The determination to switch decryption mode can further be based on an analysis of an impact of switching decryption mode. Decryption module 144 is configured to decrypt the secure session using the selected decryption mode, switching decryption modes as instructed by the mode selection module 142.

A communication session is a non-secure session that uses a transport layer connection. The transport layer connection is established with an exchange of messages of a transport layer protocol, such as TCP. Once the communication session is established using a reliable protocol, such as TCP, there is a capability for reliable transfer of data between the client and server.

A secure session is a stateful communication session that uses a secure connection that sits on top of the transport layer connection. The secure connection is established with an exchange of messages of a transport layer security protocol, such as TLS. The secure session uses a cryptographic protocol that allows for secure communication. Once the secure session is established, there is a capability for transfer of data between the client and server using the cryptographic protocol for preventing eavesdropping and tampering.

Accordingly, the term "secure session" refers to secure transport layer sessions in which a secure channel is established at the transport level. The term transport layer security (TLS) is used broadly throughout to refer to a protocol for establishing a secure channel at the transport level, and is not intended to be limited to a particular version or a particular protocol, but to any transport layer session for which a secure channel is established. TLS terms and TLS sessions are referenced in the disclosure by way of example and without an intention of limiting the disclosure to a particular protocol or particular type of secure session.

Network monitor 102 includes a central processing unit (CPU), random access memory (RAM), and a storage medium, which can be connected through buses and used to further support the processing of the received packets. Programmable instructions can be stored in the storage medium and executed by the CPU to cause the CPU to perform operations described herein. The storage medium can also store L3 cache 150, client cache 152, and/or session statistics store 154. Network monitor 102 can be implemented as physical or virtual devices. Whether implemented as physical or virtual device(s), network monitor 102 uses a local or remote hardware processing device that executes software instructions, which enables performance of the disclosed functions.

Each of mode selection module 142 and decryption module 144 can be accessible by network monitor 102, and can be integrated with or external from network monitor 102. In addition, each of mode selection module 142 and decryption module 144 can be implemented using software, hardware, and/or firmware.

Protected network 112 supports communication between protected nodes 114. Protected network 112 can include one or more networks, such as an intranet, a local area network (LAN), and/or a wide area network (WAN). In examples, protected network 112 can be an enterprise network, such as a school network, business network, and government network, to list a few examples, that can connect to the Internet. The external network 116 can include one or more WANs, e.g., the Internet, which may be used to access protected network 112.

In embodiments, at least portions of the network monitor 102 are located between the external network 116 and the protected network 112. In other embodiments, at least portions of the network monitor 102 are located within the external network 116 or protected network 112. At least portions of the network monitor 102 can be located at a network edge (inside or outside of the protected network 114) or deeper within the protected network 112.

In the example shown, one protected network 112 is shown, however one skilled in the art will recognize that the network monitor 102 can provide a protection service to multiple protected networks 112. Similarly, the number of protected nodes 114 per protected network is not limited to a particular number.

The network monitor 102 includes or communicates with hardware, firmware, and/or software components that are configured to observe content of packets included in network traffic. Network monitor 102 can include central or distributed elements for observing, intercepting, and/or analyzing network data. These elements can be passive or active and include software, firmware, and/or hardware components, such as taps, probes, or port mirrors. These elements can be positioned inline, and/or remote relative to communication links 120 and 122.

Each of protected nodes 114 and external nodes 116 can be a computing device such as a server, laptop device, network element (such as routers, switches, and firewalls), embedded computer device that is embedded in other devices, such as appliances, tools, vehicles, or consumer electronics, mobile devices, such as laptops, smartphones, cell phones, and tablets. The protected nodes 114 and external nodes 116 can each operate as a client or as a server in a client/server exchange that uses a client-server protocol. The disclosure is directed to scenarios in which an external node 116 operates as a client and submits a request (PFS or non-PFS) to a protected node 114 that is operating as a server.

L3 cache 150, client cache 152, and session statistics store 154 can be stored in a storage device that includes computer system readable media in the form of volatile or non/volatile memory or storage media, such as random access memory (RAM), cache memory, a magnetic disk, an optical disk, etc. The storage device can be accessible by network monitor 102, and can be integrated with or external from network monitor 102.

Network traffic can flow via communications links 120 and 122. The network traffic flowing via communication links 120 and 122 can include layer three (L3) and layer seven (L7) traffic. The Open Systems Interconnection (OSI) model defines L3 as a network layer and L7 as a network layer. The network traffic flows to and from external network 116 via wired and/or wireless communication links 120. Network traffic flows between the network monitor 102 and the protected nodes 114 of the protected network(s) 112 via wired and/or wireless communication links 122.

With reference now to FIGS. 2A-5, shown are flowcharts and process flow diagrams demonstrating implementation of the various exemplary embodiments. It is noted that the order of operations shown in FIGS. 2A-5 is not required, so in principle, the various operations may be performed out of the illustrated order. Also certain operations may be skipped, different operations may be added or substituted, some operations may be performed in parallel instead of strictly sequentially, or selected operations or groups of operations may be performed in a separate application following the embodiments described herein.

Language that refers to the transfer of information is not meant to be limiting. For example, the term "receive" as used herein refers to obtaining, getting, accessing, retrieving, reading, or getting a transmission. Use of any of these terms is not meant to exclude the other terms. Data that is transferred to or from a module can be transferred by a transmission to or from the module, or can include the data in a location that can be accessed by the module or is provided in a manner to be accessible to another module.

When a request is sent from an external node 116 operating as a host to a protected node 114 operating as a server, the request passes through network monitor 102, which operates as a middlebox. Network monitor 102 can operate in a passive mode or an active mode. Operation in passive mode is undesirable when a client request uses PFS since it can cause a loss of the benefits sought by PFS and/or can add risk of loss by attack of a session key. Operation in active mode for non-PFS requests by active proxying network traffic adds a security session that increases both network Round Trip Time (RTT) and cryptographic operations.

Figure 2A:
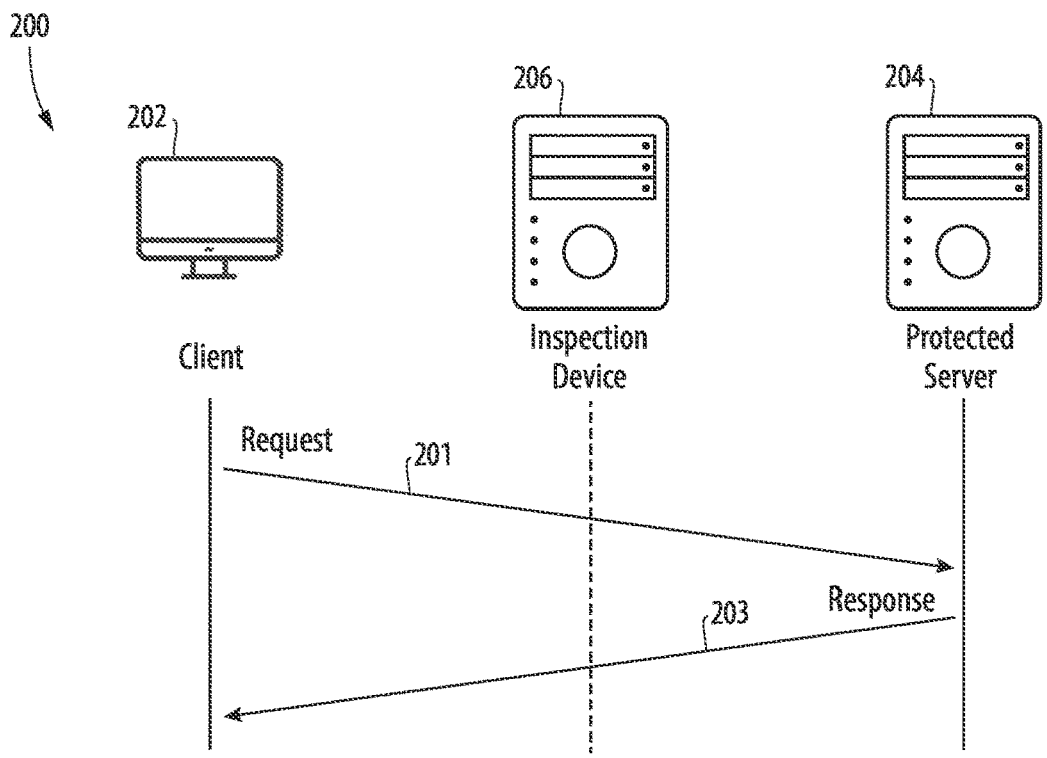
FIG. 2A illustrates a process flow diagram showing an example method of secured communication between a client and a protected server that is monitored by an inspection device when operating in a passive mode, in accordance with an embodiment of the disclosure.

Decryption can be optimized by actively decrypting PFS sessions and passively decrypting non-PFS sessions. It is noted that PFS sessions and non-PFS sessions are both secure sessions that use different modes of cryptography. For example, with reference to FIGS. 2A and 2B, process flow diagrams 200 and 220 are shown, respectively. Process flow diagram 200 of FIG. 2A shows high level operation of secured communication between a client 202 and a protected server 204 that is monitored by an inspection device 206 when operating in a passive mode. Process flow diagram 220 of FIG. 2B shows high level operation of secured communication between the client 202 and the protected server 204 as monitored by inspection device 206 when operating in an active mode.

As shown in FIG. 2A, in passive mode (ideally used for non-PFS sessions), a client 202 (e.g., an external host 116 shown in FIG. 1 operating as a client) sends a request at transmission 201 to a protected server 204 (e.g., a protected host 114 shown in FIG. 1 operating as a server) is passed via inspection device 206. The protected server 204 sends a response at transmission 203 that is passed via server 204 to client 202.

Figure 2B:
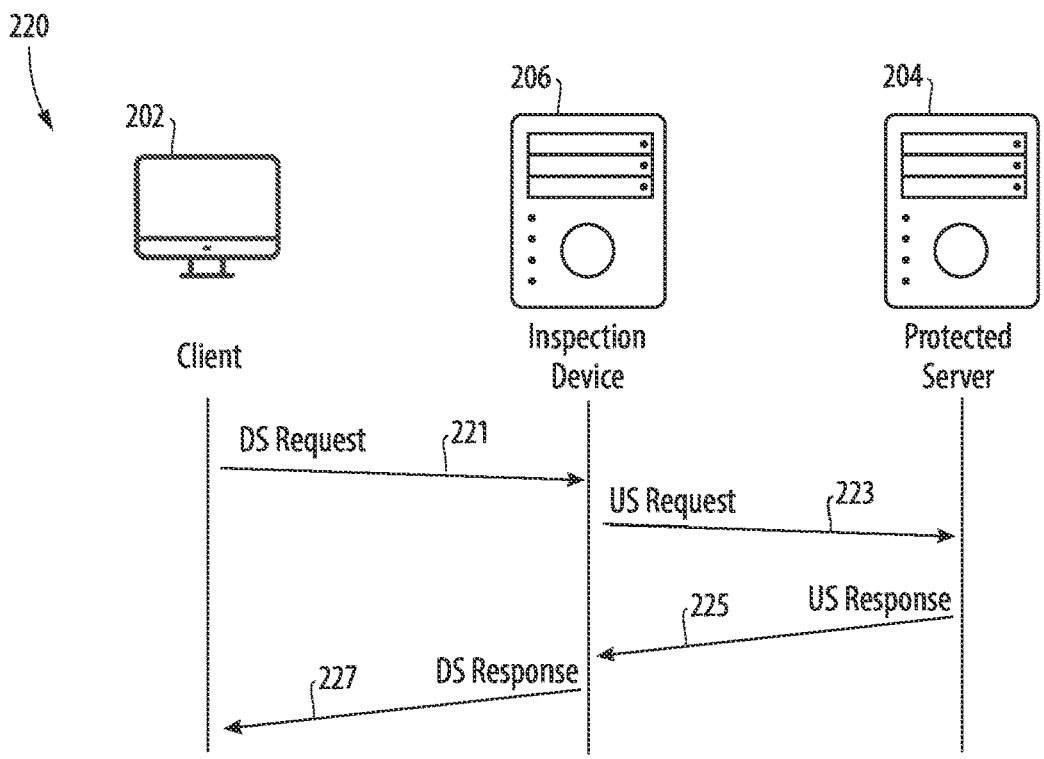
FIG. 2B illustrates a process flow diagram showing an example method of secured communication between a client and a protected server that is monitored by an inspection device when operating in an active mode, in accordance with an embodiment of the disclosure.

As shown in FIG. 2B, in active mode (ideally used for PFS sessions), the client 202 sends a downstream request (wherein downstream and upstream refer to directionality of a source or destination relative to the inspection device 206) at transmission 221 to the protected server 204. Inspection device 206 acts as a proxy and resubmits the request as an upstream request at transmission 223 to the protected server 204. The protected server 204 sends an upstream response at transmission 225 that is observed by inspection device 206. Inspection device 206 acts as a proxy and resubmits the response as a downstream response at transmission 227 to the protected client 202.

Unfortunately, when using certain security protocols for establishing a secure channel, such as different versions of TLS, it is unknown whether a TLS session will use PFS or non-PFS until a substantial portion of the performance penalty is already realized, such as when an upstream TLS channel is established (e.g., when an upstream TLS Server Hello message is received). Once the TLS Server Hello message is received, it is no longer possible to switch decryption modes without resetting the TLS session at the transport layer, after which the decryption mode can be switched when the client reconnects. It is unknown whether the TLS session will last long enough for gains in performance to justify incurring the performance penalty associated with resetting the TLS session.

Accordingly, network monitor 102 improves or optimizes decryption performance over time by applying one or more statistical methods to data collected from previously inspected secured transport layer sessions. The system operates by selecting a most probable decryption method in initial stages of a session and validating that mode at several stages throughout the session lifecycle, and switching the mode only when doing so will have a measurable impact on the performance of the session or the overall system.

For any given TLS session, mode selection uses up to three discreet calculations. The first calculation, referred to as initial decryption mode, is responsible for selecting the most probable decryption mode for the TLS session, performed in the initial stage of the underlying transport connection setup. The, referred to as early mode transition, is responsible for determining if it would likely be beneficial to reset the connection in the alternate decryption mode, performed in the initial stages of the TLS session negotiation. The third calculation, referred to as just-in-time mode transition, is responsible for determining if it would be beneficial to reset the connection in the alternate decryption mode, performed in the later stages of the TLS session negotiation.

The initial decryption mode (the first calculation) includes two stages and takes place upon receipt of a first downstream transport layer packet, e.g., TCP SYN. Once the decryption mode is calculated, it is set as the current decryption mode for that communication session and the system proceeds to operate under that mode for the communication session, unless it is dynamically switched. This is referred to as the communication session mode.

In the first stage, before a secure session is established, a lookup in L3 cache 150 is performed using communication session characteristics, such as source IP, destination IP, and destination Port to determine modes used for previously observed sessions. L3 cache 150 stores the current decryption mode (active or passive) for previously observed sessions.

Each entry of the L3 cache 150 corresponds to a previously observed secure session and includes characteristics of its underlying transport layer connection, for example, source IP, destination IP, and destination port and an associated decryption mode that was calculated by the second or third calculations. The returned value of the lookup in L3 cache 150 is either non-existent (e.g., −1) or a value that indicates which modes were stored in the L3 cache 150. In this case, the value can range between 0 (representing passive mode) and 1 (representing active mode), inclusive. If the value is either 0 or 1, the respective mode is selected, otherwise the first calculation continues to the second stage. Once a mode is selected, it can be implemented, such as by decryption module 144 (shown in FIG. 1).

The second stage includes performing a summation over several tuples (function, series, weights), performing each function on the series, and applying the weights before applying a smoothing function to get the final mode 0 (Passive) or 1 (Active). The output of the second stage is used to update the L3 cache by adding an entry for the communication session and the decryption mode determined.

Regarding the tuples, several functions, series, and weights are available, and a particular function, series, and weight is selected for each tuple. The function is applied to each mode of the series and a weight (provided as a percentage, all of the weights for a set of tuples totaling 100%) is applied to a result of applying the function. Each function applies a unique set of one or more statistical methods, such as simple mean, simple median, exponential moving average, random choice using probability, etc. The output of each function is a prediction mode.

The series is a list of modes for previously observed sessions. Each mode in the series was observed as having been used for a particular combination of characteristics of a communication session (e.g., Source IP, Destination IP and/or Destination Port) or for the network as a whole.

Example 1: "81.128.85.206", "4.93.87.227", "443": [Active, Active, Passive, Active, Passive, . . . ], meaning for the combination of characteristics (Source IP, Destination IP, Destination Port)=("81.128.85.206", "4.93.87.227", "443"), the listed modes (an incomplete list is provided) were observed.

Example 2: "0.0.0.0/0" (Entire Network): [Active, Passive, Active, Passive, Passive, . . . ], meaning for the entire network, the listed modes (an incomplete list is provided) were observed.

At this point, before establishment of a secure session, the current decryption mode has been set for the particular communication session and any changes in the communication session and a future secure session resulting from the following calculations would require a mode transition. Any mode transition would take place by switching the decryption mode and resetting the transport layer connection for both the downstream and upstream directions, such as by sending a TCP RST to both the client and the server. For example, mode selection module 142 and instruct decryption module 144 to switch from using one of the active mode to using the passive mode. When the client reconnects, the mode will have been switched and the initial decryption mode calculation can be skipped, since the mode has been intentionally set.

The early mode transition (the second calculation) also includes two stages and takes place upon receipt of a first downstream message for establishing a secure downstream channel, which will be referred to, for illustration purposes, as a TLS Client Hello message. In the first stage a list of cipher suites advertised in the Client Hello message is consulted to extract which decryption modes the downstream is capable of supporting. The decryption modes included in the cipher suites advertised by the TLS Client Hello message are referred to as downstream supporting modes. A determination is made whether the downstream supporting modes include the current decryption mode (meaning the current decryption mode is supported). If it is determined that the current decryption mode is supported, the second calculation progresses to stage two. Otherwise, the L3 cache is updated with using the communication session characteristics for the underlying communication session and mode information for a new mode and a mode transition is initiated to the new mode.

In an example of operation of the first stage in the second calculation, if the current decryption mode were passive, and the client presented a list of all active cipher suites, the supporting modes would not contain the current decryption mode, and a mode transition would be initiated.

The second stage of the second calculation uses the advertised list of cipher suites to perform a hash lookup in client cache 152 for previously observed secure sessions. Client cache 152 is used to map cipher suite lists that were previously seen in TLS Client Hello messages from other secure sessions to the modes that were ultimately selected when establishing an upstream secure channel (e.g., in a TLS Server Hello) for the secure session. In one or more embodiments, client cache 152 can store a single entry with the most recently seen value (if any) or a value representing all or recently seen values that is determined using a statistical method. The returned value of the lookup in client cache 152 can be non-existent (e.g., −1) or a value that indicates either of passive (e.g., 0) or active (1) modes (or somewhere there between). In this case, the value is either 0 or 1. If the returned value is −1 or the same as the current decryption mode, the current decryption mode is determined to be supported and the second calculation ends, meaning the secure session is processed using the current decryption mode. Otherwise, the L3 cache is updated with using the communication session characteristics for the underlying communication session and mode information for a new mode, and a mode transition is initiated to the new mode.

The just in time mode transition (the third calculation) includes several stages and takes place upon receipt of a first upstream message for establishing a secure upstream channel, which will be referred to, for illustration purposes, as a TLS Server Hello message.

In a first stage of the third calculation a list of cipher suites advertised in the Server Hello message is consulted to determine the upstream supporting modes by extracting decryption modes from the advertised cipher suites that the upstream is capable of supporting. A determination is made whether the upstream supporting modes support the current decryption mode. If the upstream supporting modes are determined to support the current decryption mode, the third calculation ends, meaning the secure session is processed using the current decryption mode, otherwise a second stage of the third calculation is performed.

In the second stage of the third calculation, it is determined whether the current decryption mode and the upstream supporting modes are compatible. An incompatibility arises when the supported decryption mode is passive and the current mode is active mode (also referred to as an active session), since a passive decryption mode would be unable to decrypt an active session. When an incompatibility arises, a mode transition is initiated.

In a third stage of the third calculation, a passive retry time and active session time are predicted (both from the perspective of the server) and compared. The predictions of passive active retry time and active session time can be performed using statistics selected from session statistics store 154. If the passive retry time is less than the active session time, a mode transition is initiated, otherwise the secure session continues using the current session mode.

Passive retry time is a sum of passive session time from the perspective of the server, retry time from the perspective of a client, and a constant. The passive session time refers to the duration of a secure session in the passive mode, e.g., from receipt by the protected server 206 of a first downstream transport layer packet of a TCP open process, e.g., TCP SYN, to transmission to the server of a last upstream layer packet of a TCP close process, e.g., TCP_TCP_FIN or TCP RST.

The predicted passive session time is determined by consulting the session statistic store 156. The session statistics store stores duration of sessions in the passive mode and duration of secure sessions in the active mode from the perspective of the server. The predicted passive session time can be a function of one or more statistical methods, such as simple mean, simple median, exponential moving average, random choice using probability, applied to durations for all secure sessions or similar secure sessions in the passive mode. Similar secure sessions can be, for example, secure sessions that have the same combination of characteristics (e.g., same ciphers and TLS versions, same server IP address).

The client retry time is a client RTT multiplied by the retry modifier. The client RTT is the amount of time it would take to retry downstream handshaking for establishing communication at the transport level added to an optional predetermined constant that compensates for _the server overhead incurred by the additional request. The retry modifier is calculated by comparing, using data stored in the session statistics store 156, average RTTs against average actual client retry times of past sessions.

The predicted active session time (from the perspective of the server) is determined by consulting the session statistic store 156 as a function of one or more statistical methods, such as simple mean, simple median, exponential moving average, random choice using probability, applied to durations for all secure sessions or similar secure sessions in the active mode. Active session time from the perspective of the server can be the time from transmission of an upstream TLS Server Hello until transmission of a downstream TCP of a last upstream layer packet of a TCP close process, e.g., TCP_FIN OR RST.

Figure 3:
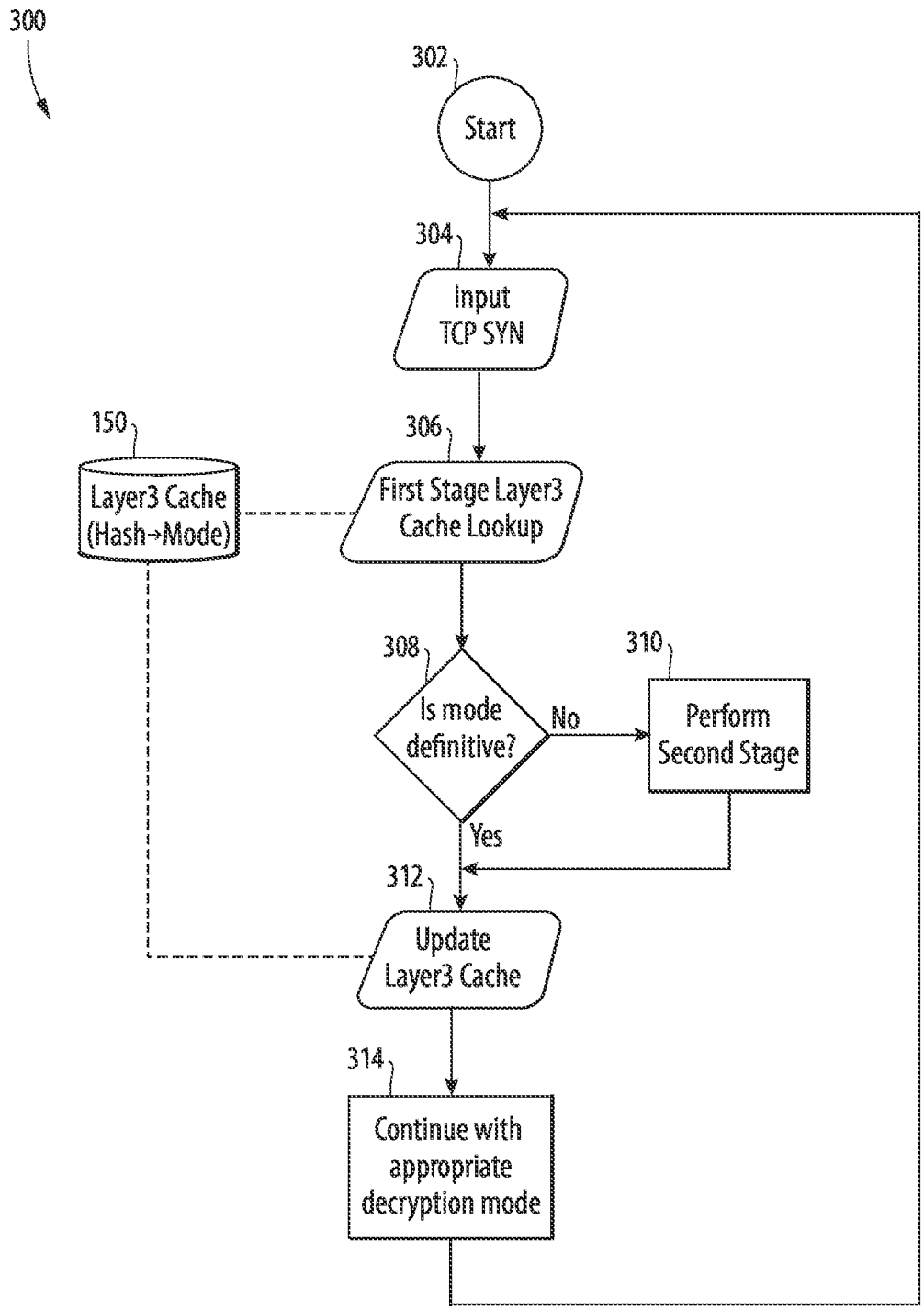
FIG. 3 illustrates a flowchart showing an example method of operation of the mode selection module of FIG. 1 when performing a first calculation for an initial decryption mode, in accordance with an embodiment of the disclosure.

FIG. 3 shows a flowchart 300 of operations performed by a network monitor, such as mode selection module 142 of network monitor 102 shown in FIG. 1, for implementing the first calculation (initial decryption mode). Operations start at block 302. At block 304, a first downstream transport layer packet is received from a downstream client (e.g., an external node 116 shown in FIG. 1) for initiating establishment of a connection using an underlying transport protocol. The underlying transport protocol can be, for example, transport control protocol (TCP) or stream control transmission protocol (SCTP). TCP and TCP terms are used by way of example of an underlying transport protocol and its commands, but is not intended to limit the disclosure to a particular underlying transport protocol. Establishment of the underlying transport protocol is a first step in starting a TLS session, since the TLS session is established on top of the underlying transport protocol, meaning TLS packets are layered on top of a transport protocol, such as TCP, so that after a TCP connection is established, packets that belong to a TLS session are transmitted in the TCP connection.

At block 306, in the first stage of the first calculation, a lookup operation is performed in an L3 cache, such as L3 cache 150 shown in FIG. 1. A result of the lookup operation indicates whether an entry was found (e.g., −1 indicating not found) in the L3 cache that matched characteristics (e.g., source IP, destination IP, and destination port) of the current communication session, and if an entry was found, a value (e.g., ranging between 0 (representing passive mode) and 1 (representing active mode), inclusive) representative of the modes observed.

At block 308, a determination is made whether the lookup operation indicates that a mode for an entry that matches the characteristics of the communication session is definitive (meaning an entry was found, and the returned value is passive mode (0) or active mode (1)).

If the determination at block 308 is NO, meaning that the mode for a matching entry is not definitive, the method continues at block 310. At block 310, the second stage of the first calculation is performed, which includes applying a summation over several tuples (function, series, weights), resulting in a final mode (e.g., passive mode (0) or active mode (1)). If the determination at block 308 is YES, meaning that the mode for the matching entry is definitive, the mode indicated is selected. The method continues at block 312. At block 312, the L3 cache is updated using output of block 310 by adding an entry using the characteristics of the communication session and the decryption mode that was selected or updating the matching entry.

The method continues at block 314, at which the decryption mode that was calculated is set as the current decryption mode for the communication session. Processing of the communication session and a secure session that will be established thus proceeds using the current decryption mode.

Figure 4:
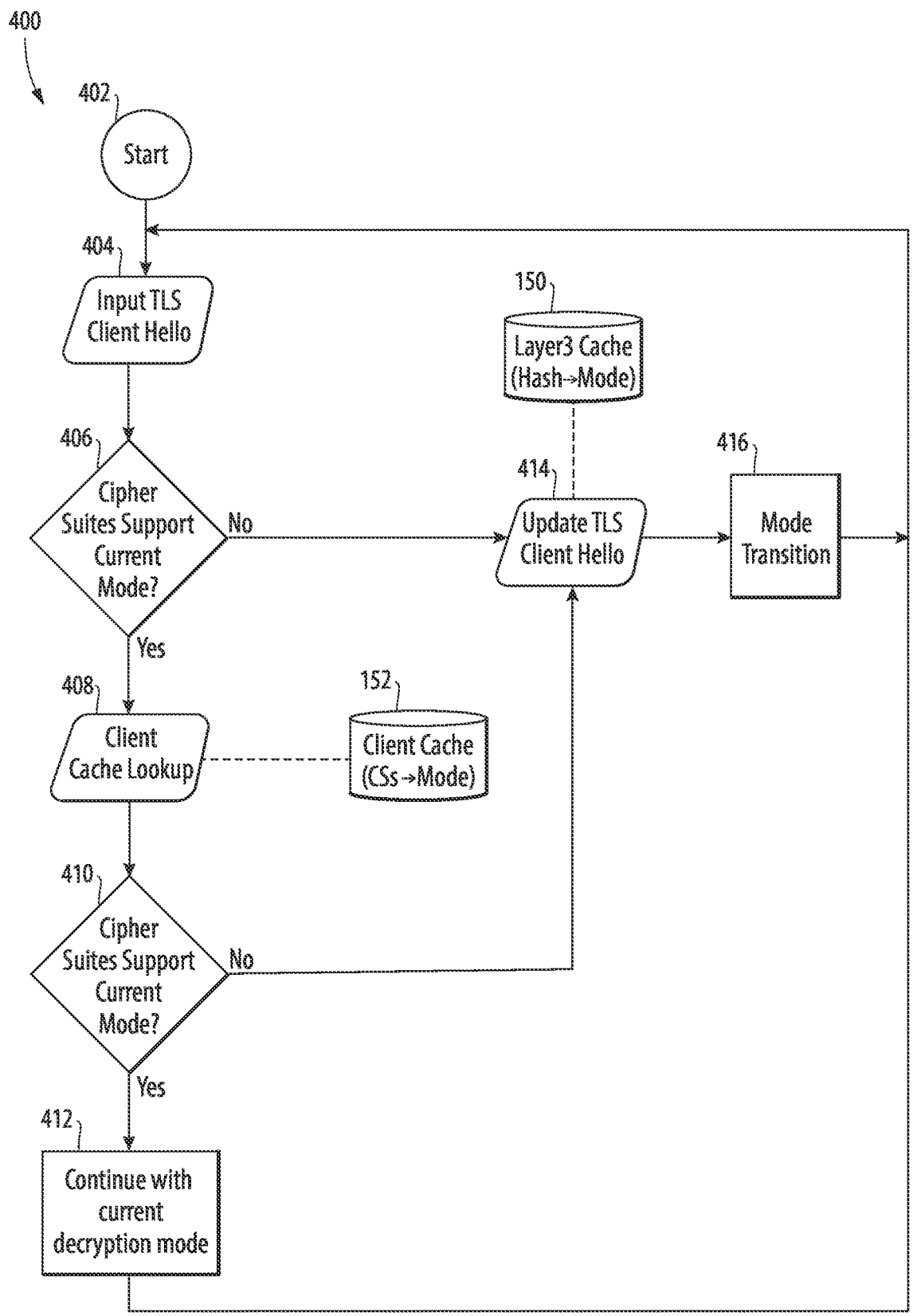
FIG. 4 illustrates a flowchart showing an example method of operation of the mode selection module of FIG. 1 when performing a second calculation for an early mode transition, in accordance with an embodiment of the disclosure.

FIG. 4 shows a flowchart 400 of operations performed by a network monitor, such as mode selection module 142 of network monitor 102 shown in FIG. 1, for implementing the second calculation (early mode transition). Operations start at block 402. At block 404, a downstream security channel is established (e.g., by receipt of a TLS Client Hello message. At block 406 in the first stage of the second calculation, a determination is made whether the downstream supporting modes extracted from the cipher suites advertised in the TLS Client Hello message support the current decryption mode. If the determination at block 406 is YES, meaning the current decryption mode is supported by the downstream supporting modes, the method continues at block 408 for performance of the second stage. If the determination at block 406 is NO, meaning the current decryption mode is not supported by the downstream supporting modes, the method continues at block 414 for updating the L3 cache, and at block 416 for transitioning mode.

At block 408, performance of the second stage of the second calculation is begun by performing a hash lookup in a client cache, such as client cache 152 shown in FIG. 1, for previously observed secure sessions, to determine if there are any entries in the client cache that map the cipher suite list advertised in the TLS Client Hello message to a decryption mode.

At block 410 a determination is made whether the advertised cipher suites support the current decryption mode. The determination is based on a returned value from the hash lookup of the client cache that was performed in block 408. If it is determined at block 410 NO, meaning the advertised cipher suites do not support the current decryption mode, the method continues at block 414 and 416 for updating of the L3 cache and a mode transition. If it is determined at block 410 YES, meaning the advertised cipher suites support the current decryption mode, meaning the returned value is −1 or the a value that indicates the current decryption mode, the method continues at block 412. At block 412, processing of the secure session continues using the current decryption mode.

Figure 5:
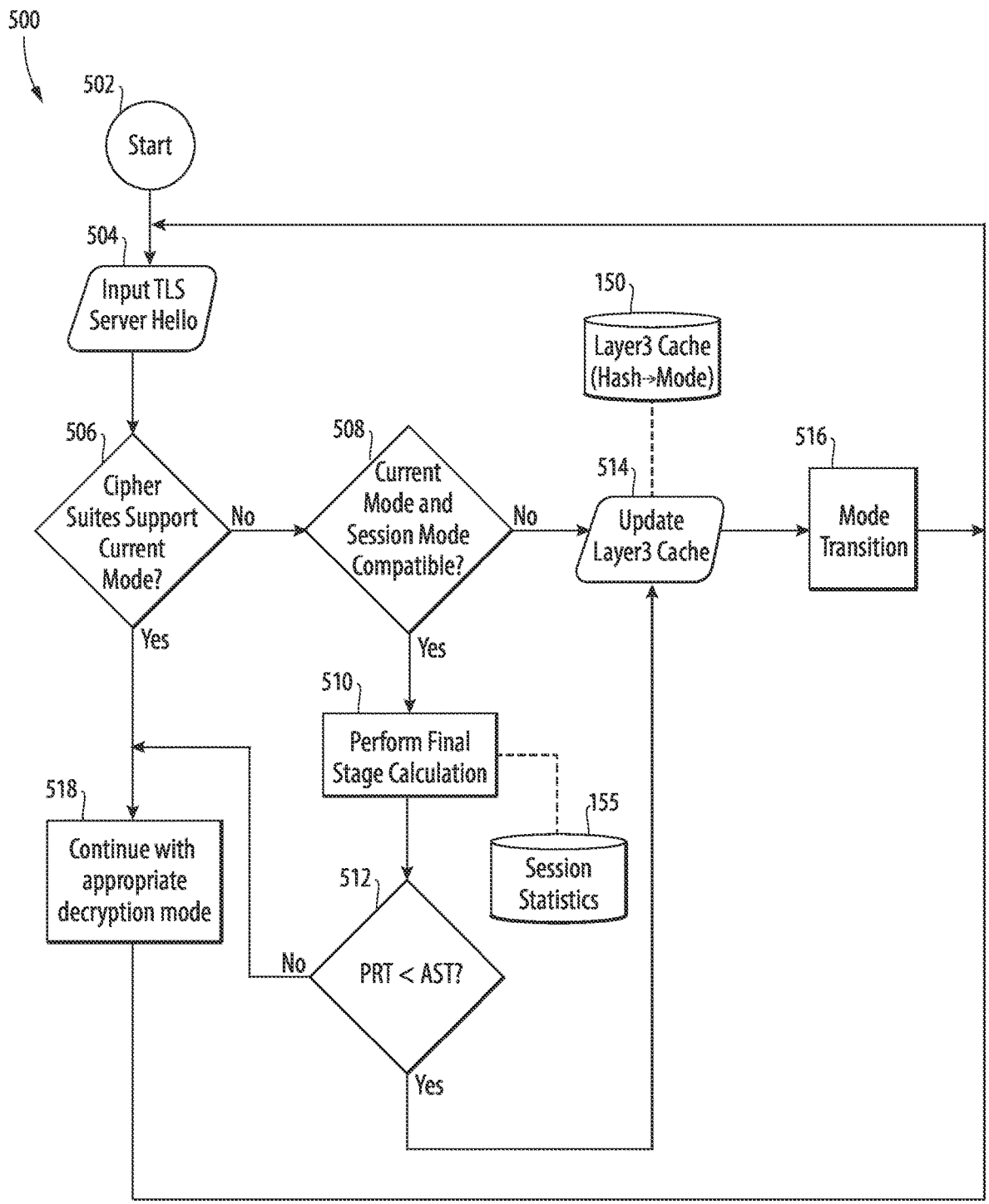
FIG. 5 illustrates a flowchart showing an example method of operation of the mode selection module of FIG. 1 when performing a third calculation for a just-in-time mode transition, in accordance with an embodiment of the disclosure.

FIG. 5 shows a flowchart 500 of operations performed by a network monitor, such as mode selection module 142 of network monitor 102 shown in FIG. 1, for implementing the third calculation (just-in-time mode transition). Operations start at block 502. At block 504, an upstream security channel is established (e.g., by receipt of a TLS Server Hello message. At block 506 in the first stage of the third calculation, a determination is made whether the upstream supporting modes extracted from the cipher suites advertised in the TLS Server Hello message support the current decryption mode.

If the determination at block 506 is YES, meaning the current decryption mode is supported by the upstream supporting modes, the method continues at block 518. At block 518, processing of the secure session continues using the current decryption mode.

If the determination at block 506 is NO, meaning the current decryption mode is not supported by the upstream supporting modes, the method continues at block 508 for performance of the second stage.

At block 508, performance of the second stage of the third calculation is begun by determining whether the current decryption mode and the upstream supporting modes are compatible.

If the determination at block 508 is NO, meaning the current decryption mode is not compatible with the upstream supporting modes, the method continues at block 514 for updating the L3 cache, and at block 516 for transitioning mode.

If the determination at block 508 is YES, meaning the current decryption mode is compatible with the upstream supporting modes, the method continues at block 510 for performance of the third stage of the third calculation.

At block 510, the third stage of the third calculation is begun by determining a passive retry time (PRT) and an active session time (AST), both from the perspective of the server. The passive retry time is the predicted passive session time (meaning the duration of a secure session in the passive mode) added to a source retry time.

At block 512, a determination is made whether the passive retry time is less than the active session time. If it is determined at block 512 YES, meaning the passive retry time is less than the active session time, the method continues at blocks 514 and 516 for updating of the L3 cache and performing a mode transition. If it is determined at block 512 NO, meaning the passive retry time is not less than the active session time, the method continues at block 518. At block 518, processing of the secure session continues using the current decryption mode.

In accordance with the disclosed method and system, a decryption mode is selected in an initial stage of setting up a secure session. The initial stage can begin after initiation of a transport level connection and before the connection is established, after the transport level connection is established, and at an early stage (after initiation from a downstream client only) of establishing the secure session, or conditionally after the transport level connection is established and at a later stage (after initiation from a downstream client and response from an upstream server) of establishing the secure session if an impact criterion is satisfied. The disclosed method and system use statistics to determine probability of the passive or active mode being supported or successfully used in the past in order to determine whether or not to switch modes.

The disclosed method and system provide an ability to monitor a network and dynamically switch between passive and active decryption, thus retaining the intended benefits of PFS by acting as a proxy when a secure session is predicted to use an active decryption mode, and increasing efficiency by avoiding acting as a proxy when a secure session is predicted to use a passive decryption mode. The disclosed method and system can operate with currently available security hardware, interface with currently available security software, and will increase in value as the security landscape shifts to greater adoption of PFS.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the network monitor 102 shown in FIG. 1 may be implemented or executed by one or more computer systems. For example, network monitor 102 can be implemented using a computer system such as example computer system 600 illustrated in FIG. 6. In various embodiments, computer system 600 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 600 is only one example of a suitable system and is not intended to suggest any limitation as to the scope of use or functionality of embodiments of the disclosure described herein. Regardless, computer system 600 is capable of being implemented and/or performing any of the functionality set forth hereinabove.

Computer system 600 may be described in the general context of computer system-executable instructions, such as program modules, being executed by a computer system. Generally, program modules may include routines, programs, objects, components, logic, data structures, and so on that perform particular tasks or implement particular abstract data types. Computer system 600 may be practiced in distributed data processing environments where tasks are performed by remote processing devices that are linked through a communications network. In a distributed data processing environment, program modules may be located in both local and remote computer system storage media including memory storage devices.

Figure 6:
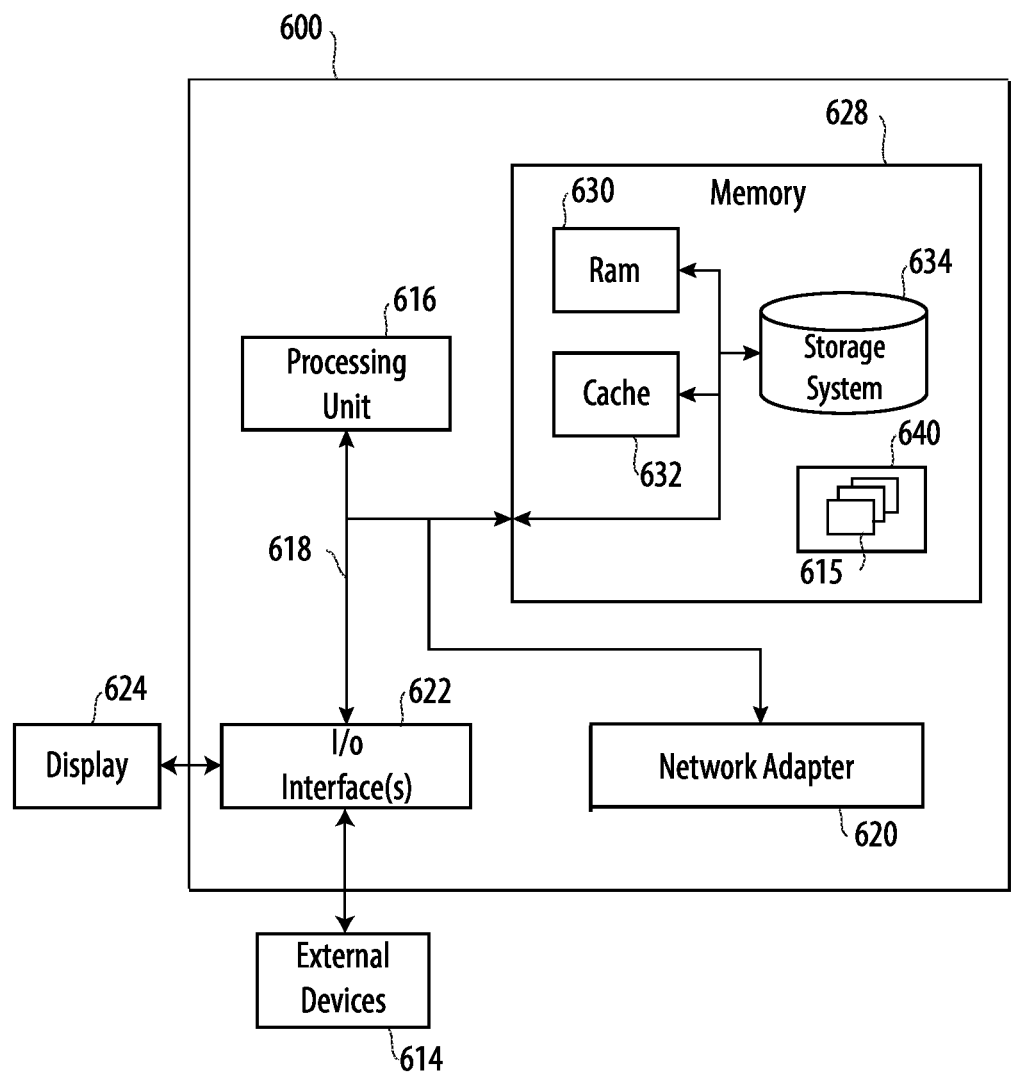
FIG. 6 illustrates an example computing system that could be used to implement a mode selection module, as shown in FIG. 1, in accordance with an embodiment of the disclosure.

Computer system 600 is shown in FIG. 6 in the form of a general-purpose computing device. The components of computer system 600 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 600 typically includes a variety of computer system readable media. Such media may be any available media that is accessible by computer system 600, and it includes both volatile and non-volatile media, removable and non-removable media.

System memory 628 can include computer system readable media in the form of volatile memory, such as random access memory (RAM) 630 and/or cache memory 632. Computer system 600 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the disclosure.

Program/utility 640, having a set (at least one) of program modules 615, such as mode selection module 142 and decryption module 144 shown in FIG. 1, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 615 generally carry out the functions and/or methodologies of embodiments of the disclosure as described herein.

Computer system 600 may also communicate with one or more external devices 614 such as a keyboard, a pointing device, a display 624, etc.; one or more devices that enable a user to interact with computer system 600; and/or any devices (e.g., network card, modem, etc.) that enable network monitor 102 to communicate with one or more other computing devices. Such communication can occur via Input/Output (I/O) interfaces 622. Still yet, computer system 600 can communicate with one or more networks such as a local area network (LAN), a general wide area network (WAN), and/or a public network (e.g., the Internet) via network adapter 620. As depicted, network adapter 620 communicates with the other components of network management server 104 via bus 618. It should be understood that although not shown, other hardware and/or software components could be used in conjunction with computer system 600. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A computer-implemented method of selecting active or passive decryption mode when observing network traffic between a downstream client and an upstream server, the method comprising:
    selecting a first decryption mode in an initial stage of setting up a secure session based on a determination of a decryption mode based on decryption modes used for similar and/or past secure sessions, wherein the initial stage is when the client initiates a transport layer connection;
    when the first decryption mode is active, before switching from the first decryption mode, determining whether an impact of changing the first decryption mode to a second decryption mode would satisfy an impact criterion by:
        predicting a retry time to reset the transport layer connection for both downstream and upstream channels of the secure session and for the client to reconnect to the secure session with the second decryption mode;
        predicting an active session time of the secure session without resetting the transport layer connection or switching from the first decryption mode,
            wherein the impact criterion is satisfied when a predicted passive session time, including the retry time, is less than the predicted active session time; and
    responsive to determining the impact criterion is satisfied, switching the first decryption mode to the second decryption mode.

2. The computer-implemented method of claim 1, wherein determining whether an impact of changing the first decryption mode to the second decryption mode would satisfy an impact criterion is performed after the server establishes the secure session and communicates which security algorithms it can support for the secure session.

3. The computer-implemented method of claim 1, wherein the predicted retry time for the downstream channel is based on a measured round trip time of the client and a comparison of a statistical function of actual round trip times for the client.

4. The computer-implemented method of claim 1, wherein the second decryption mode is not evaluated again after the switch from the first decryption mode to the second decryption mode.

5. The computer-implemented method of claim 1, wherein the similar secure sessions can include multiple series of secure sessions, each series of secure sessions defined by different session characteristics.

6. A network monitor for observing network traffic and selecting active or passive decryption mode between a downstream client and an upstream server, the network monitor comprising:
- a memory configured to store a plurality of programmable instructions; and
- at least one processing device in communication with the memory, wherein the at least one processing device, upon execution of the plurality of programmable instructions is configured to:
- select a first decryption mode in an initial stage of setting up a secure session based on a determination of a decryption mode based on decryption modes used for similar and/or past secure sessions, wherein the initial stage is when the client initiates a transport layer connection;
- when the first decryption mode is active, before switching from the first decryption mode, determine whether an impact of changing the first decryption mode to a second decryption model would satisfy an impact criterion by:
  - predicting a retry time to reset the transport layer connection for both downstream and upstream channels of the secure session and for the client to reconnect to the secure session with the second decryption mode;
  - predicting an active session time of the secure session without resetting the transport layer connection or switching from the first decryption mode,
    - wherein the impact criterion is satisfied when a predicted passive session time, including the retry time, is less than the predicted active session time; and
- responsive to determining the impact criterion is satisfied, switch the first decryption mode to the second decryption mode.

7. The network monitor of claim 6, wherein determining whether an impact of changing the first decryption mode to the second decryption mode would satisfy an impact criterion is performed after the server establishes the secure session and communicates which security algorithms it can support for the secure session.

8. The network monitor of claim 6, wherein the predicted retry time for the downstream channel is based on a measured round trip time of the client and a comparison of a statistical function of actual round trip times for the client.

9. The network monitor of claim 6, wherein the second decryption mode is not evaluated again after the switch from the first decryption mode to the second decryption mode.

10. The network monitor of claim 6, wherein the similar secure sessions can include multiple series of secure sessions, each series of secure sessions defined by different session characteristics.

11. A non-transitory computer readable storage medium and one or more computer programs stored therein, the computer programs comprising instructions, which when executed by a computer system, cause the computer system to:
- select a first decryption mode in an initial stage of setting up a secure session based on a determination of a decryption mode based on decryption modes used for similar and/or past secure sessions, wherein the initial stage is when a client initiates a transport layer connection;
- when the first decryption mode is active, before switching from the first decryption mode, determine whether an impact of changing the first decryption mode to a second decryption mode would satisfy an impact criterion by:
  - predicting a retry time to reset the transport layer connection for both downstream and upstream channels of the secure session and for the client to reconnect to the secure session with the second decryption mode;
  - predicting an active session time of the secure session without resetting the transport layer connection or switching from the first decryption mode,
    - wherein the impact criterion is satisfied when a predicted passive session time, including the retry time, is less than the predicted active session time; and
- responsive to determining the impact criterion is satisfied, switch the decryption mode.

* * * * *